(12) United States Patent
Kitamura et al.

(10) Patent No.: US 6,227,776 B1
(45) Date of Patent: May 8, 2001

(54) MACHINE TOOL

(75) Inventors: Akihiro Kitamura; Kousaku Kitamura; Shigeru Yamada, all of Takaoka (JP)

(73) Assignee: Kitamura Machinery Co., Ltd. (JP)

( * ) Notice: Subject to any disclaimer, the term of this patent is extended or adjusted under 35 U.S.C. 154(b) by 0 days.

(21) Appl. No.: 09/173,740

(22) Filed: Oct. 16, 1998

(30) Foreign Application Priority Data

Dec. 3, 1997 (JP) .................................................. 9-347338

(51) Int. Cl.$^7$ ....................................................... B23C 9/00
(52) U.S. Cl. ......................... 409/159; 414/749; 414/222; 74/490.07
(58) Field of Search ........................... 74/490.07, 490.09; 409/118, 201, 211, 216, 224; 248/657, 661

(56) References Cited

U.S. PATENT DOCUMENTS

| | | | | |
|---|---|---|---|---|
| 4,077,163 | * | 3/1978 | Bennett, Jr. et al. | 51/165 |
| 4,099,348 | * | 7/1978 | Kata et al. | 51/92 |
| 4,234,150 | * | 11/1980 | Mee et al. | 248/281 |
| 4,273,482 | * | 6/1981 | Llyod et al. | 409/80 |
| 4,306,464 | * | 12/1981 | Mosher | 74/479 |
| 4,567,782 | * | 2/1986 | Speicher et al. | 74/96 |
| 4,790,441 | * | 12/1988 | Hansen | 212/147 |
| 4,897,015 | * | 1/1990 | Abbe et al. | 414/744 |
| 5,013,210 | * | 5/1991 | Bond | 414/744 |
| 5,147,175 | * | 9/1992 | Tada | 414/749 |
| 5,267,818 | * | 12/1993 | Marantette | 409/132 |
| 5,405,222 | * | 4/1995 | Ward | 409/201 |
| 5,611,248 | * | 3/1997 | Peltier | 74/490.09 |
| 5,730,574 | * | 3/1998 | Adachi et al. | 414/222 |
| 5,807,044 | * | 9/1998 | Watari et al. | 409/183 |
| 5,919,014 | * | 7/1999 | Weck et al. | 409/201 |

FOREIGN PATENT DOCUMENTS 659 362 * 4/1979 (SU) ..................................... 409/190

* cited by examiner

Primary Examiner—Stephen F. Gerrity
Assistant Examiner—Adrian Wilson
(74) Attorney, Agent, or Firm—Lorusso & Loud

(57) ABSTRACT

A machine tool in which a feed member is fed in a feeding direction relative to a fixed member wherein the feed member is guided by a linear linkage mechanism including a first arm linked to the fixed member at its one end so as to swivel about a first axis, a second arm having the same length as the first arm and being linked to the first arm at its one end so as to swivel about a second axis and also linked to the feed member at its other end so as to swivel about a third axis. A first gear is secured on the fixed member at the one end of the first arm and is coaxial with the first axis. A second gear is secured on the second arm at the other end thereof and is coaxial with the second axis. A chain is provided around the first and the second gears. The first gear has a diameter twice that of the second gear.

8 Claims, 6 Drawing Sheets

MACHINE TOOL

BACKGROUND OF THE INVENTION

The present invention relates to a machine tool in which a feed member, such as a table or a head, is guided by a guide means and is fed by a drive means in a feeding direction relative to a fixed base member.

In a conventional machine tool, a table or a head is guided by a rail having a dovetail shape, for example. In such a guide means, a sliding contact between two facing members is inevitable.

Recently, higher and higher speeds have been required of the table or the head in the machine tool. For such a high speed feeding, several novel mechanisms have been suggested, with focus on link mechanisms because they have no sliding members such as rails or their counterparts. Some link mechanisms have been practically applied to high speed feeding in a machine tool. In such a high speed feeding, link mechanisms are intended to guide the feed member as well as to drive it.

In conventional link mechanisms, a plurality of axial members for feeding are driven via corresponding servo motors, so that the feed member moves in a predetermined linear path or curved path. Therefore, a complicated control program for driving the plurality of servomotors in synchronism is necessary. However, such a control program is troublesome to prepare and costly.

SUMMARY OF THE INVENTION

The object of the present invention is to provide a machine tool wherein a feed member is guided by a simple linkage mechanism, which is applicable to high speed feeding without costly and troublesome control programs.

According to the present invention, a feed member is guided by a linear linkage mechanism. The linkage mechanism comprises a first arm linked to a fixed member at its one end so as to swivel about a first axis, and a second arm having the same length as the first arm, the second arm being linked to the first arm at its one end so as to swivel about a second axis and also linked to the feed member at its other end so as to swivel about a third axis. A first gear or pulley is secured on the fixed member at the one end of the first arm and coaxial with the first axis, a second gear or pulley is secured on the second arm at the other end thereof and is coaxial with the second axis, and a chain or belt is wound between the first and the second gears or pulleys. The first gear or pulley has a diameter twice that of the second gear or pulley.

The feed member is a table for accepting a workpiece to be machined or a spindle head, provided with a spindle for receiving a tool, for example.

The feed member can be guided by two or four linear linkage mechanisms.

The feed member can be guided by a conventional roller type or a slide type guide mechanism in addition to the linear linkage mechanism.

PREFERRED EMBODIMENTS OF THE INVENTION

Preferred embodiments according to the present invention are described hereinafter with reference to the drawings.

Figure 1:
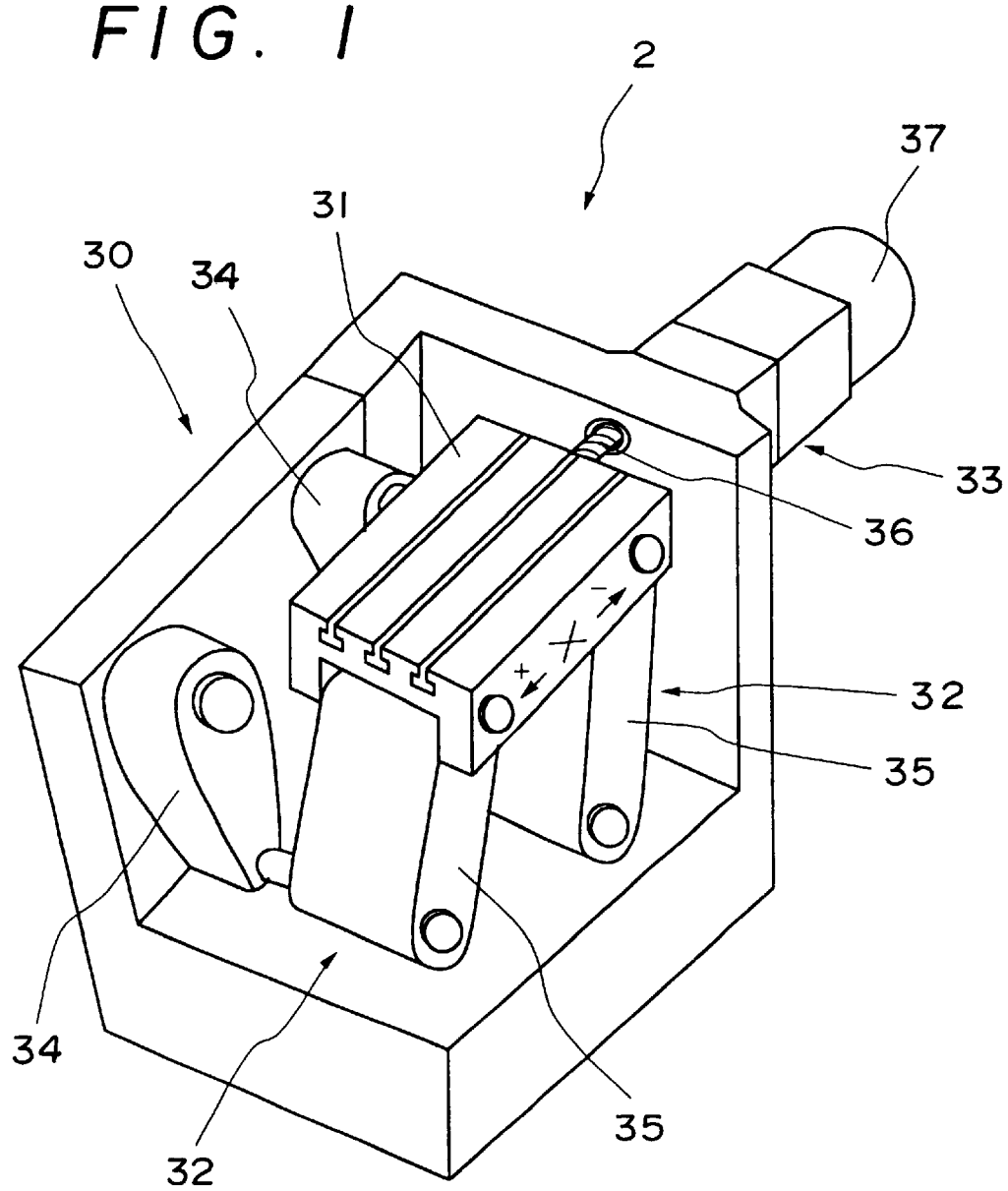
FIG. 1 is a perspective view showing a guide device for a table in a machine tool according to the present invention.

A guide device 30, illustrated in FIG. 1, is intended to guide a table 31 along x axis in a machine tool 2.

The guide device 30 comprises a linear linkage mechanism 32 for guiding the table 31 along the x axis, and a drive means 33 for supplying a drive force to the table 31.

The table 31 is guided so as to slide along x axis, not by a slide type guide means such as a rail or the like but, rather, exclusively by two linear linkage mechanisms 32, each composed of a pair of arms 34, 35.

The drive means 33 comprises a ball screw 36 aligning parallel to the x axis, a servo motor 37 connected to one end of the ball screw 36 for supplying a drive force and a ball nut (not shown) fixedly mounted on the table 31 and meshing with the ball screw 36 for cooperating therewith. The drive means 33 does not guide the table 31 at all, but drives it for feeding along the x axis.

The guide device 30 for the table 31, shown in FIG. 1, can be applied to various conventional machine tools. It can be also combined with a spindle head device which will be described below, whereby a machine tool equipped with the spindle head and the table is provided.

Figure 2:
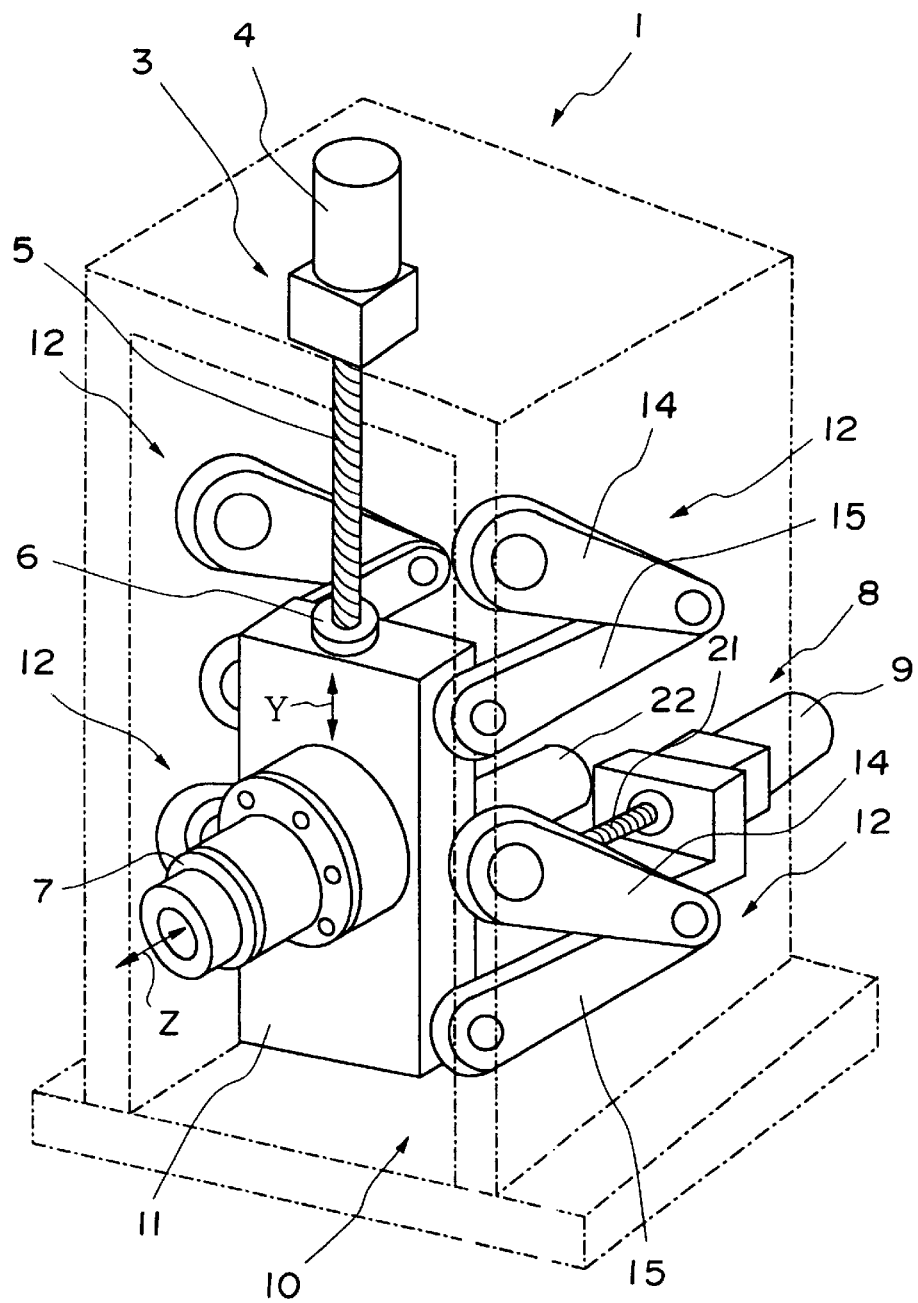
FIG. 2 is a perspective view showing a guide device for a spindle head in a machine tool according to the present invention.
Figure 3:
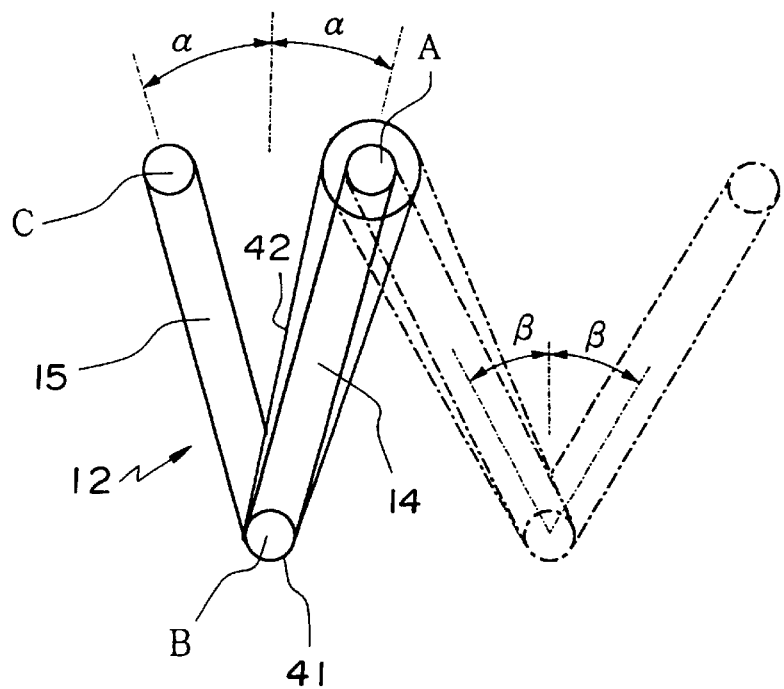
FIG. 3 is a view illustrating operation of a linear linkage mechanism in a machine tool according to the present invention.

FIG. 2 shows another embodiment of the present invention in the form of a machine tool 1 including guide device 10. Guide device 10 includes four linear linkage mechanisms 12 for guiding a spindle head 11 along the y axis, and a drive means 3 for supplying a drive force to the spindle head 11. Each linear linkage mechanism 12 is composed of arms 13 and 14. The spindle head 11 is guided exclusively by the four linear mechanisms 12.

The drive means 3 comprises a ball screw 5 aligned parallel to the y axis, a servo motor 4 connected to one end of the ball screw 5 for supplying force, a ball nut 6 fixedly mounted on the spindle head 11 and meshing with the ball screw 5 for cooperating therewith.

The spindle head 11 is equipped with a spindle 7. The spindle 7 can be rotated at high speed by a drive motor 22.

The spindle 7 is guided by the guide device 10 for telescopic movement along the z axis by a drive force from a drive means 8.

The drive means 8 comprises a ball screw 21 aligned parallel to the z axis, a servo motor 9 connected to one end of the ball screw 21 for supplying a drive force, a ball nut (not shown) fixedly mounted on the spindle 7 and meshing with the ball screw 5 for cooperating therewith. When the ball screw 5 is rotated the ball nut, and consequently the spindle head 7 is linearly moved.

The linear linkage mechanism 12, shown in FIG. 2, will now be described hereinafter in more detail with reference to FIGS. 3–6. The linear linkage mechanism is also called a direct driven type linkage.

The linear linkage mechanism 12 comprises a first arm 14 and a second arm 15 for link connection between the feed member 11 (11 not shown in FIG. 3) and the fixed base member (fixed base member not shown in FIGS. 3—6). The first arm 14 is linked at its one end to the fixed base member so as to swivel about an axis A. The second arm 15 is linked at its one end to the feed member 11 so as to swivel about an axis C. The second arm 15 is also linked at its other end to the other end of the first arm 14 so as to swivel about an axis B. The second arm 15 has the same length as the first arm 14.

A first pulley or a first gear is fixedly mounted on the fixed base member at the one end of the first arm 14. And the first pulley or gear 40 is coaxial with the axis A.

A second pulley or a second gear 41 is fixedly mounted at the other end of the second arm 15. And the second pulley or gear 41 is coaxial with the axis B.

Between the first and the second pulleys or gears 40, 41 is wound a belt or a chain 42. The chain 42 can be replaced by one gear or an odd number of gears.

The diameter of the first pulley or the first gear 40 is determined to be twice that of the second pulley or the second gear 41.

Therefore the angle between the first arm 14 and the center line passing through the axis B, and the angle between the second arm 15 and the same center line should be constantly equal. The center line passing through the axis B is vertical in the drawings. Two equal angles are depicted by references alpha and beta, respectively, in FIG. 3.

Figure 4:
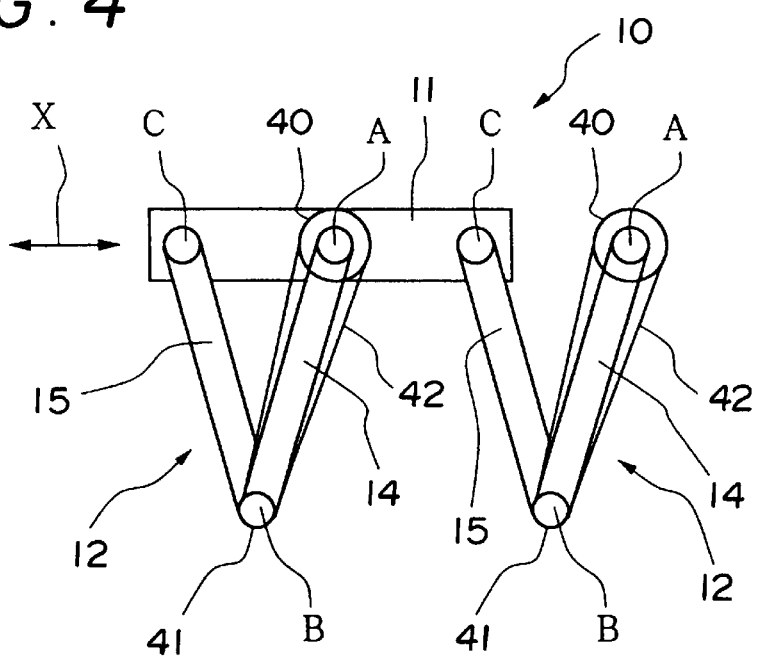
FIG. 4 is a view showing one motion of a linear linkage mechanism in a machine tool according to the present invention.
Figure 5:
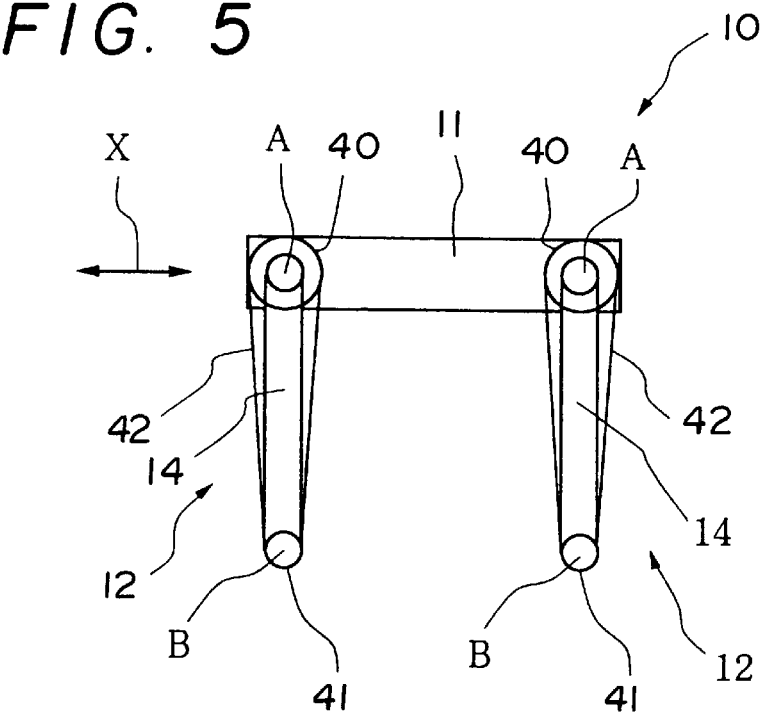
FIG. 5 is a view showing another motion of the linear linkage mechanism shown in FIG. 4.
Figure 6:
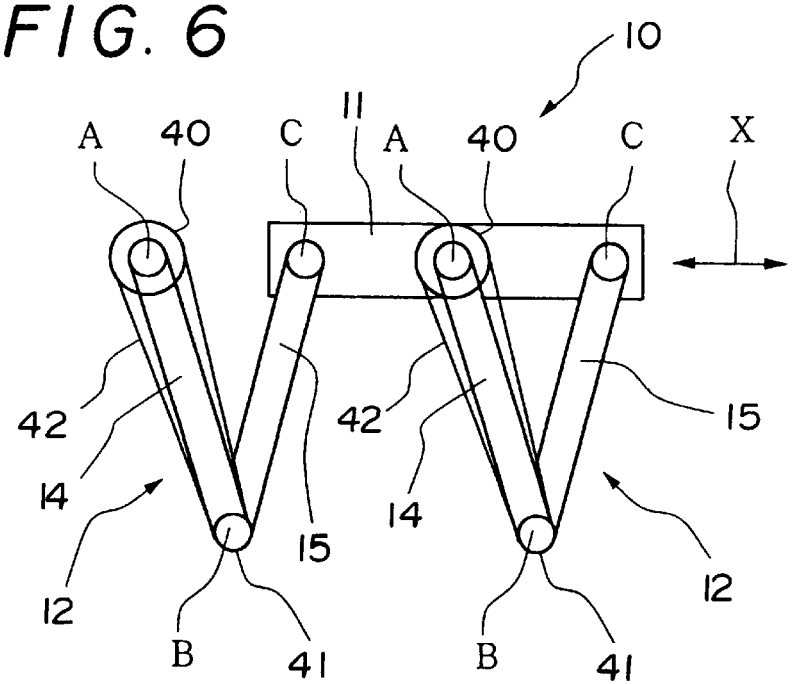
FIG. 6 is a view showing a further motion of the linear linkage mechanism shown in FIG. 4.

FIGS. 4–6 illustrate the feed member 11 located in the left position, the neutral position, and the right position respectively. Thus the feed member 11 is guided so as to slide along the x axis by means of the guide mechanism 12.

Figure 7:
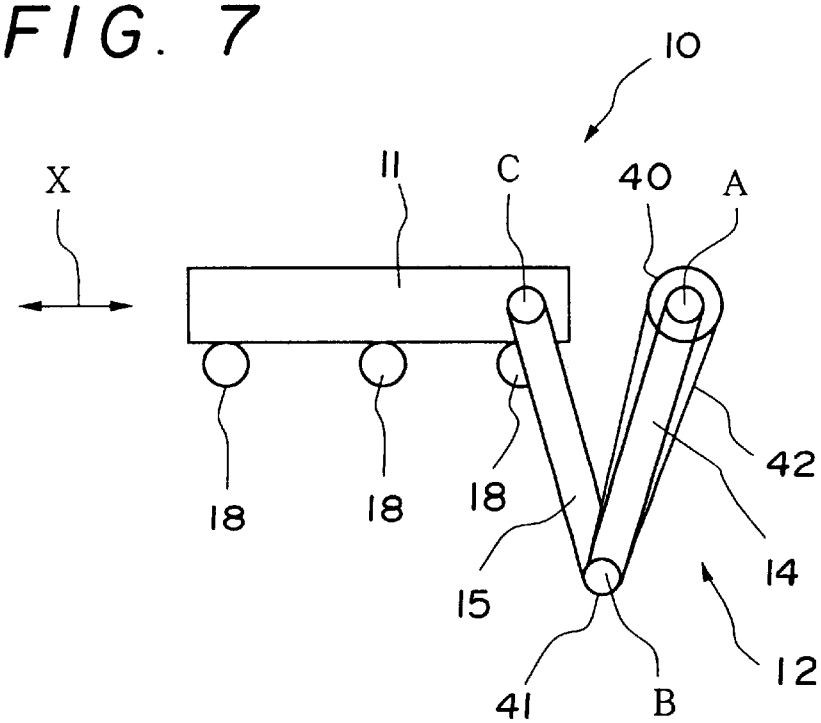
FIG. 7 is a view showing one motion of a modified linear linkage mechanism in a machine tool according to the present invention.
Figure 8:
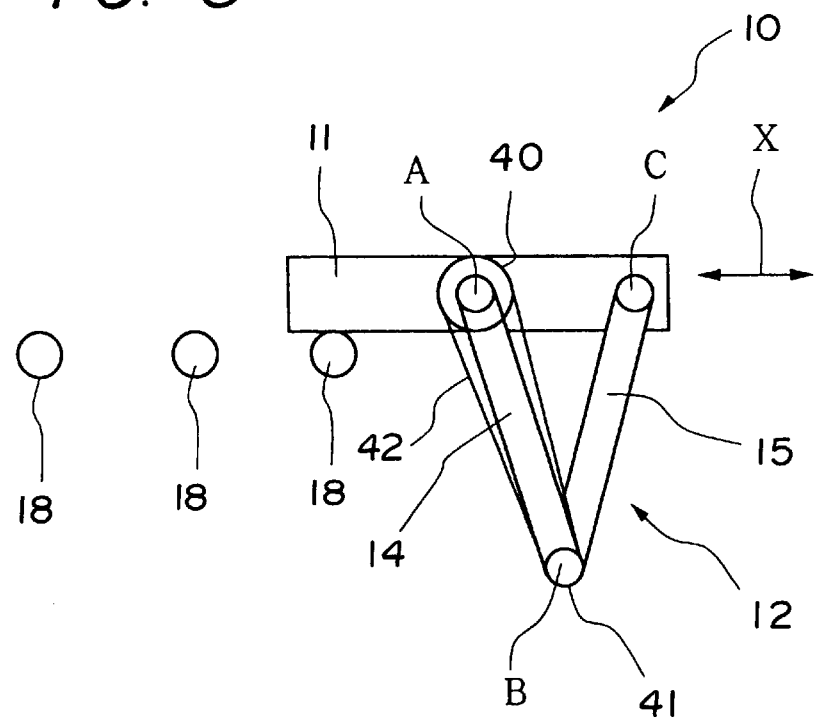
FIG. 8 is a view showing another motion of the modified linear linkage mechanism shown in FIG. 5.

A modified embodiment of the guide device according to the present invention is shown in FIGS. 7 and 8.

Figure 9:
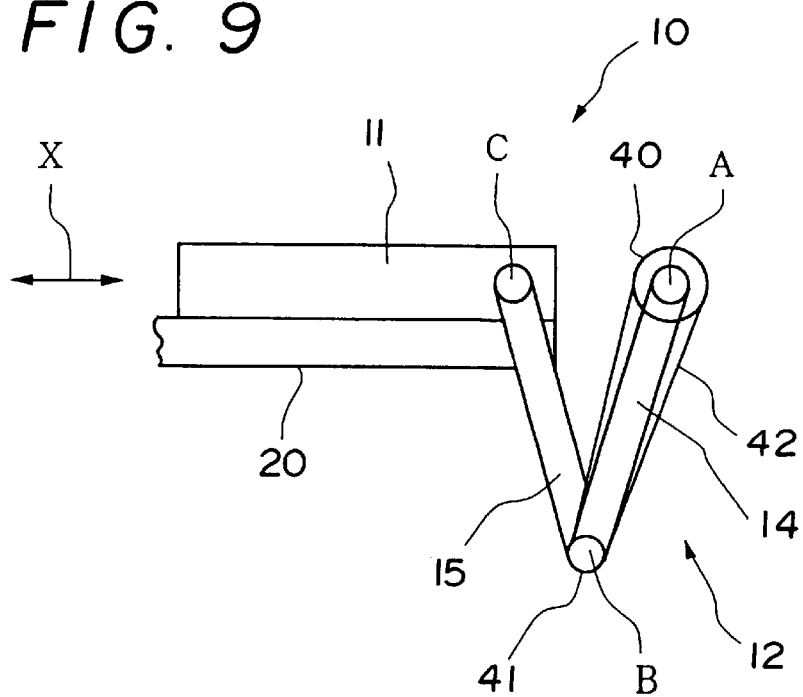
FIG. 9 is a view showing a conventional slide type mechanism combined with a linear linkage mechanism of the present invention.
Figure 10:
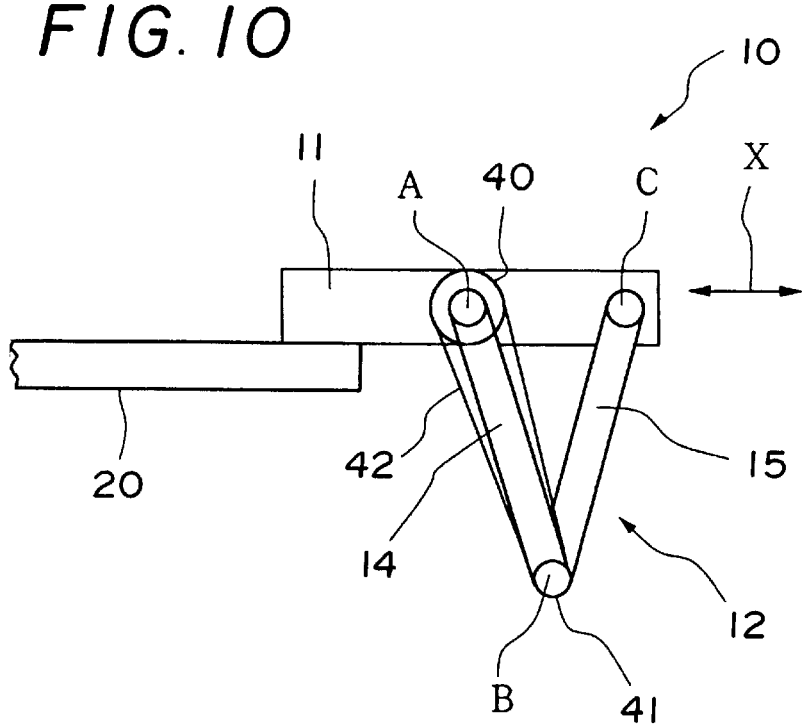
FIG. 10 is a view showing another position for the embodiment of FIG. 9.

This guide device 10 is provided with two linear linkage mechanisms 12 disposed on front and rear faces of the feeding member 11, respectively, and with a conventional roller type guide mechanism 18 aligned along the x axis. The guide mechanisms 12 and 18 cooperate with each other to guide the feed member along the x axis. A conventional slide type guide mechanism represented by rail 20 in FIGS. 9 and 10 can replace the roller type guide mechanism 18.

In such a guide mechanism wherein the conventional roller type or slide type guide mechanism is used in addition to the linear linkage mechanism 12 according to the invention, the load on the roller type or the slide type guide mechanism is decreased.

What is claimed is:

1. A machine tool in which a work table for accepting a workpiece to be machined is fed in a feeding direction relative to a fixed member, characterized in that the work table is guided by a linear linkage mechanism, the linear linkage mechanism comprising a first arm linked to the fixed member at its one end so as to swivel about a first axis, a second arm having the same length as the first arm, the second arm being linked to the first arm at its one end so as to swivel about a second axis and also linked to the work table at its other end so as to swivel about a third axis, a first gear secured on the fixed member at the one end of the first arm and being coaxial with the first axis, a second gear secured on the second arm at the other end thereof and being coaxial with the second axis, a chain wound between the first and the second gears, the first gear having a diameter twice that of the second gear.

2. A machine tool according to claim 1, wherein the work table is guided by a by two or four liner linkage mechanisms.

3. A machine tool according to claim 1, wherein the work table is guided by a by roller guide mechanisms in addition to the linear linkage mechanism.

4. A machine tool according to claim 1, wherein the work table is guided by a slide guide mechanism in addition to the linear linkage mechanism.

5. A machine tool in which a spindle head having a spindle for receiving a tool is fed in a feeding direction relative to a fixed member, characterized in that the spindle head is guided by a linear linkage mechanism, the linear linkage mechanism comprising a first arm linked to the fixed member at its one end so as to swivel about a first axis, a second arm having the same length as the first arm, the second arm being linked to the first arm at its one end so as to swivel about a second axis and also linked to the spindle head at its other end so as to swivel about a third axis, a first pulley secured on the fixed member at the one end of the first arm and being coaxial with the first axis, a second pulley secured on the second arm at the other end thereof and being coaxial with the second axis, a belt wound between the first and the second pulleys, the first having a diameter twice that of the second pulley.

6. A machine tool according to claim 5, wherein the spindle head is guided by two or four linear linkage mechanisms.

7. A machine tool according to claim 5, wherein the spindle head is guided by a roller type guide mechanism in addition to the linear linkage mechanism.

8. A machine tool according to claim 5, wherein the spindle head is guided by a slide type guide mechanism in addition to the linear linkage mechanism.

\* \* \* \* \*

UNITED STATES PATENT AND TRADEMARK OFFICE
CERTIFICATE OF CORRECTION

PATENT NO. : 6,227,776 B1
DATED : May 8, 2001
INVENTOR(S) : Kitamura et al.

It is certified that error appears in the above-identified patent and that said Letters Patent is hereby corrected as shown below:

<u>Column 4,</u>
Line 22, delete "a by"; and
Line 24, "by a by" should read -- by a -- and "mechanisms" should read -- mechanism --.

Signed and Sealed this

Ninth Day of April, 2002

Attest:

JAMES E. ROGAN
Director of the United States Patent and Trademark Office

Attesting Officer